US012555429B2

(12) United States Patent
Debord et al.

(10) Patent No.: US 12,555,429 B2
(45) Date of Patent: Feb. 17, 2026

(54) ACCESS CONTROL DEVICE WITH GATEWAY OPERABILITY

(71) Applicant: JANUS INTERNATIONAL GROUP, LLC, Temple, GA (US)

(72) Inventors: William Debord, Woodstock, GA (US); David P. Gengler, Draper, UT (US); Nathan Perry, Eagle Mountain, UT (US)

(73) Assignee: Janus International Group, LLC, Temple, GA (US)

(*) Notice: Subject to any disclaimer, the term of this patent is extended or adjusted under 35 U.S.C. 154(b) by 141 days.

(21) Appl. No.: 18/498,489

(22) Filed: Oct. 31, 2023

(65) Prior Publication Data

US 2024/0144759 A1 May 2, 2024

Related U.S. Application Data

(60) Provisional application No. 63/381,880, filed on Nov. 1, 2022.

(51) Int. Cl.
*G07C 9/00* (2020.01)

(52) U.S. Cl.
CPC ..... *G07C 9/00571* (2013.01); *G07C 9/00309* (2013.01); *G07C 2009/00325* (2013.01)

(58) Field of Classification Search
CPC ............ G07C 9/00571; G07C 9/00309; G07C 2009/00325; G07C 9/0069; H04L 63/083; H04L 63/101; H04W 12/08
USPC .......................................................... 340/5.61
See application file for complete search history.

(56) References Cited

U.S. PATENT DOCUMENTS

| | | | | |
|---|---|---|---|---|
| 7,825,796 B1 * | 11/2010 | Simon | G08B 25/14 340/3.3 |
| 9,524,594 B2 * | 12/2016 | Ouyang | G07C 9/27 |
| 10,083,554 B2 * | 9/2018 | Mattern | G07C 9/257 |
| 10,115,257 B2 * | 10/2018 | Abner | G07C 9/33 |
| 10,171,974 B2 * | 1/2019 | Ahearn | H04W 4/80 |
| 10,378,241 B2 * | 8/2019 | Al-Kahwati | E05B 47/0012 |
| 10,742,938 B2 * | 8/2020 | Scalisi | G07C 9/00857 |
| 11,423,718 B2 * | 8/2022 | Lee | G07C 9/00571 |
| 11,823,517 B2 * | 11/2023 | Haci | G07C 9/25 |
| 12,148,258 B2 * | 11/2024 | Imanuel | G07C 9/27 |
| 2008/0243859 A1 * | 10/2008 | Lapointe | G06Q 20/123 |
| 2009/0210089 A1 | 8/2009 | Christie et al. | |
| 2012/0062362 A1 | 3/2012 | Rudduck et al. | |
| 2012/0169461 A1 * | 7/2012 | Dubois, Jr. | G07C 9/00309 340/5.2 |

(Continued)

OTHER PUBLICATIONS

International Search Report & Written Opinion in PCT/US2023/036373 mailed Feb. 21, 2024.

(Continued)

*Primary Examiner* — Nam V Nguyen
(74) *Attorney, Agent, or Firm* — Barnes & Thornburg LLP

(57) ABSTRACT

Devices, systems, and methods for control access can implement a self-storage access control device which can operate to control access to one or more passages in a self-storage facility and can operate for gateway control for transmitting and/or receiving data over a communication network via a network interface. Operations can be configured to selectively communicate authorization for access to at least one of the passages of the self-storage facility.

14 Claims, 6 Drawing Sheets

(56) References Cited

U.S. PATENT DOCUMENTS

| | | | | |
|---|---|---|---|---|
| 2015/0015369 | A1* | 1/2015 | Lamb | E05F 15/77 340/5.71 |
| 2015/0077223 | A1* | 3/2015 | Pipes | G07C 9/33 340/5.54 |
| 2015/0199863 | A1* | 7/2015 | Scoggins | G07C 9/28 340/5.25 |
| 2015/0356801 | A1* | 12/2015 | Nitu | G07C 9/00904 340/5.61 |
| 2016/0090774 | A1 | 3/2016 | Reynolds | |
| 2018/0137704 | A1* | 5/2018 | Caterino | H04M 1/72415 |
| 2019/0180354 | A1 | 6/2019 | Greenberger et al. | |
| 2019/0228601 | A1 | 7/2019 | Grzenda et al. | |
| 2020/0219341 | A1* | 7/2020 | Khalid | G07C 9/00896 |
| 2020/0250909 | A1 | 8/2020 | Li et al. | |
| 2021/0019972 | A1 | 1/2021 | Roper et al. | |
| 2021/0019979 | A1 | 1/2021 | Mackenzie et al. | |
| 2021/0042762 | A1 | 2/2021 | Budano et al. | |
| 2022/0051499 | A1 | 2/2022 | Schwartz et al. | |
| 2022/0101423 | A1 | 3/2022 | Minsley et al. | |

OTHER PUBLICATIONS

International Search Report & Written Opinion in PCT/US2023/035887, mailed Feb. 21, 2024.

International Preliminary Report on Patentability in PCT/US2023/036373, mailed May 15, 2025.

* cited by examiner

Exterior Sliding Door Key Pad
Masonry Mount

Noke Smart Entry Key Pad

Noke Smart Entry Key Pad Screen

New Construction Wiring Diagram

ACCESS CONTROL DEVICE WITH GATEWAY OPERABILITY

CROSS-REFERENCE

This application claims priority under 35 U.S.C. § 119(e) to U.S. Provisional Patent Application No. 63/381,880, filed Nov. 1, 2022, the disclosure of which is expressly incorporated by reference herein in its entirety.

FIELD

The present disclosure generally relates to devices, systems, and methods for access control. More specifically, the present disclosure generally relates to devices, systems, and methods for access control concerning self-storage facilities.

BACKGROUND

An access control system pertains to an electronic system that facilitates automated approval for authorized individuals to enter through a secured ingress. One example of an access control system is an access control keypad system. Such a system includes a keypad device to control access to a particular area, such as a gate, building, room, and the like, using an alphanumeric code.

Access control keypad systems have applications in various industries, such as in the self-storage industry. For instance, an operator of a self-storage facility may install keypad devices areas where access needs to be controller, such as storage units, storage areas, entrance gates, loading areas, and so on. Typically, the keypad devices are interconnected via a centralized network device, such as a gateway controller.

SUMMARY

Embodiments presented herein disclose an access control keypad and gateway device.

According to an aspect of the present disclosure, a self-storage access control device may include one or more processors; a network interface; a user interface; and a memory. The memory may store keypad logic for controlling access to one or more passages in a self-storage facility. The memory may store gateway controller logic for transmitting and receiving data over a communication network via the network interface. Execution of the keypad logic by the one or more processors may be configured to selectively communicate authorization for access to at least one of the passages of the self-storage facility.

In some embodiments, the gateway controller logic may be adapted to permit direct communication between the network interface and the communication network without intermediary gateway. The network interface may include a network interface card (NIC). The NIC may include a wireless NIC.

In some embodiments, the network interface may communicate with a local network apart from the communication network. The device may be configured for communications between the local network and the communication network via the network interface. In some embodiments, the user interface may include a numerical keypad for receiving user input of numerical code. The numerical keypad may be a physical keypad including mechanical buttons. In some embodiments, the user interface may include a graphical display unit.

According to another aspect of the present disclosure, a system for access control for the self-storage facility may include the device referenced-above, and a cloud service arranged in communication with the device via the network.

According to another aspect of the present disclosure, a method of access control for a self-storage facility may include receiving, via a user interface of an access control device, a request for authorization for access to at least one passage of the self-storage facility; requesting authentication, via a network interface of the access control device arranged in communication via a communication network, responsive to the request for authorization; receiving confirmation of authentication, over the network via the network interface of the access control device, responsive to successful authentication request; and authorizing access to the at least one passage, via the access control device, responsive to confirmation of authentication.

In some embodiments, requesting authentication via the network interface of the access control device may include direct communication between the access control device and the communication network without intermediate gateway. In some embodiments, at least one of requesting authentication and receiving confirmation is conducted via a network interface card (NIC) of the network interface. In some embodiments, the NIC may be a wireless NIC.

In some embodiments, the method further includes communicating with a local network apart from the communication network. Communicating with the local network may include facilitating communications between the local network and the communications network.

In some embodiments, receiving the authentication request may include receiving user entry of a passcode. Requesting authentication may include indication of the used-entered passcode.

According to another aspect of the present disclosure, a method of access control for a self-storage facility may include receiving, via a user interface of an access control device, a request for authorization for access to at least one passage of the self-storage facility; requesting authentication, responsive to the request for authorization; receiving confirmation of authentication, responsive to successful authentication request; and authorizing access to the at least one passage, via the access control device, responsive to confirmation of authentication.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

DETAILED DESCRIPTION

Embodiments presented herein disclose an access control keypad that has a gateway controller functionality. The access control keypad may be installed at a variety of locations, such as a self-storage facility, to grant or deny access to a point of ingress at the location. The gateway controller functionality allows the access control keypad to connect directly with the network. For example, the gateway controller functionality can allow the access control keypad to connect with the network without an intermediary gateway, whether via a wireless access point (e.g., a WiFi router, mobile hotspot, or other networking device that provides access to a network such as the Internet, without interfacing) or otherwise, without the need for additional intervention for network communication. The access control keypad may thereby obtain data directly from a management platform (e.g., hosted by a cloud provider), such as user access control data, software and firmware updates, and so on. This approach also eliminates the need for a centralized gateway device to manage the keypad devices, which often requires strategic placement within a facility to achieve network proximity and also serves as a single point of failure if taken offline.

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
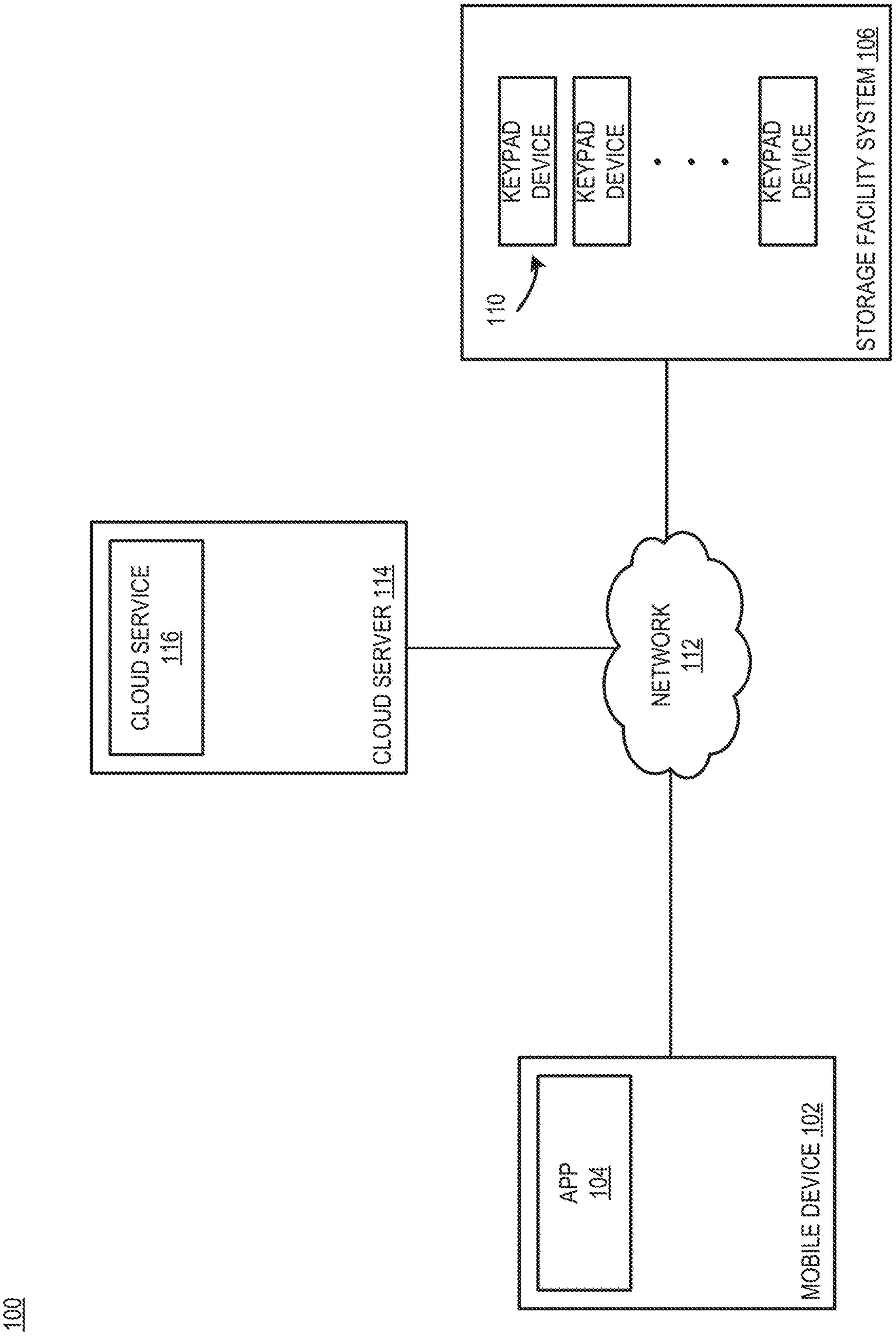
FIG. 1 illustrates an example environment in which an access control keypad and gateway device (keypad device) can be deployed, according to disclosed embodiments.

FIG. 1 illustrates an example environment 100 in which an access control keypad device having gateway controller functionality may be deployed. The example shown here is a self-storage facility, although in some embodiments, disclosed devices, systems, and/or method may be applied in various facilities, e.g., medical centers, laboratories, data centers, office buildings, etc. As shown, the environment 100 includes a mobile device 102, a storage facility system 106, and a cloud server 114. As shown, the mobile device 102, storage facility system 106, and cloud server 114 are connected with a network 112 (e.g., the Internet).

The mobile device 102 may be embodied as any physical computing device accessible by a user (e.g., a tenant user, an operator or employee of the storage facility system 106, a system administrator, etc.) having wireless communication functionality, such as a smart phone, smart tablet, laptop device, a key fob device, etc. The mobile device 102 may be owned by a tenant user, a device located on-site at the underlying self-storage facility, a device located remotely from the self-storage facility (e.g., at a management console associated with the self-storage facility), and so on. Illustratively, the mobile device 102 also includes an app 104. The app 104 allows the user to access a variety of features provided by the system 106, including communicating with a keypad device 110.

In the illustrative embodiment, the storage facility system 106 comprises a local network (different from the network 112) of interconnected devices to control various features of the underlying self-storage facility, such as unit door control, HVAC settings and temperature control, tenant access, facility monitoring, and so on. Illustratively, the storage facility system 106 includes one or more keypad devices 110. The cloud server 114 is embodied as one or more physical or virtual computing resources pooled together to provide cloud-based services, such as the cloud service 116. The cloud service 116 processes communications (e.g., messages, requests, etc.) sent by a keypad device 110. The storage facility system 106 may also transmit information to the app 104 via the cloud service 116.

A keypad device 110 is an electronic access control device that may be installed in one of various locations within the self-storage facility to control access to an ingress (and/or egress) at the location. The keypad device 110 is coupled with a locking device fitted on or around a passage at the ingress, such as a storage unit, a door, a gate, etc. In an embodiment, the keypad device 110 includes a keypad on the surface of the housing that has one or more keys each labeled with alphanumeric characters.

A user may input a unique combination of numbers corresponding to a passcode via the keypad device 110. The keypad device 110 may authenticate the user using the passcode. In the illustrative embodiment, the keypad device 110 can transmit an authentication request for authentication to the cloud service 116 via the network. The authentication request can be generated by the keypad device 110, via the network interface, responsive to the user input as a request for authorization for access. The authentication request can include the passcode, and/or indication thereof. Responsive to successful authentication request, the cloud service 116 can issued confirmation of authentication, via the network, to the keypad device 110. The confirmation may include confirmation information, such as appropriate secure communication keys.

Once authenticated, the keypad device 110 can authorize access. In the illustrative embodiment, in response to confirmation of authentication, the keypad device 110 authorizes access to the appropriate passageway(s) of the facility. The keypad device 110 illustratively activates the locking device to unlock (and/or lock) the passage, for example, by issuing an unlock command for the locking device secured with a gate or door of the facility. In some embodiments, the keypad device 110 may cross-reference the user input with locally-stored access control data, e.g., access control data that is pre-transmitted by the cloud service 116, predefined by the user on-site, etc., to determine appropriate authorization for access. For example, periodically-updated access control data may be communicated by the cloud service 116 via the network to the keypad device 110 and/or other local memory store for consideration by the keypad device 110 at a local level to determine appropriate access. In some embodiments, encryption techniques may be applied to access control communications, for example, public/private keys, SSL certificate, RSA encryption, and/or other suitable secure communication techniques.

In the illustrative embodiment, the keypad device 110 includes gateway controller functionality within the housing of the unit. The gateway controller functionality may be embodied as any combination of hardware, software, and circuitry to provide the keypad device 110 with connectivity to a network, such as the network 112, via a wireless access point (e.g., a network router, switch, etc.), without needing to connect with a centralized gateway controller device. By providing the keypad device 110 with direct network connectivity, e.g., via a wireless access point, the keypad device 110 may communicate with the cloud service 116 without an intermediate gateway controller device.

In some embodiments, the keypad device 110 may also include components enabling for other types of wireless communication. For instance, the keypad device 110 may include a Radio Frequency ID (RFID), Near-Field Communication (NFC), or Bluetooth reader/communications to communicate with a mobile device 102 (e.g., a fob device) to authenticate access to a passage.

Figure 2:
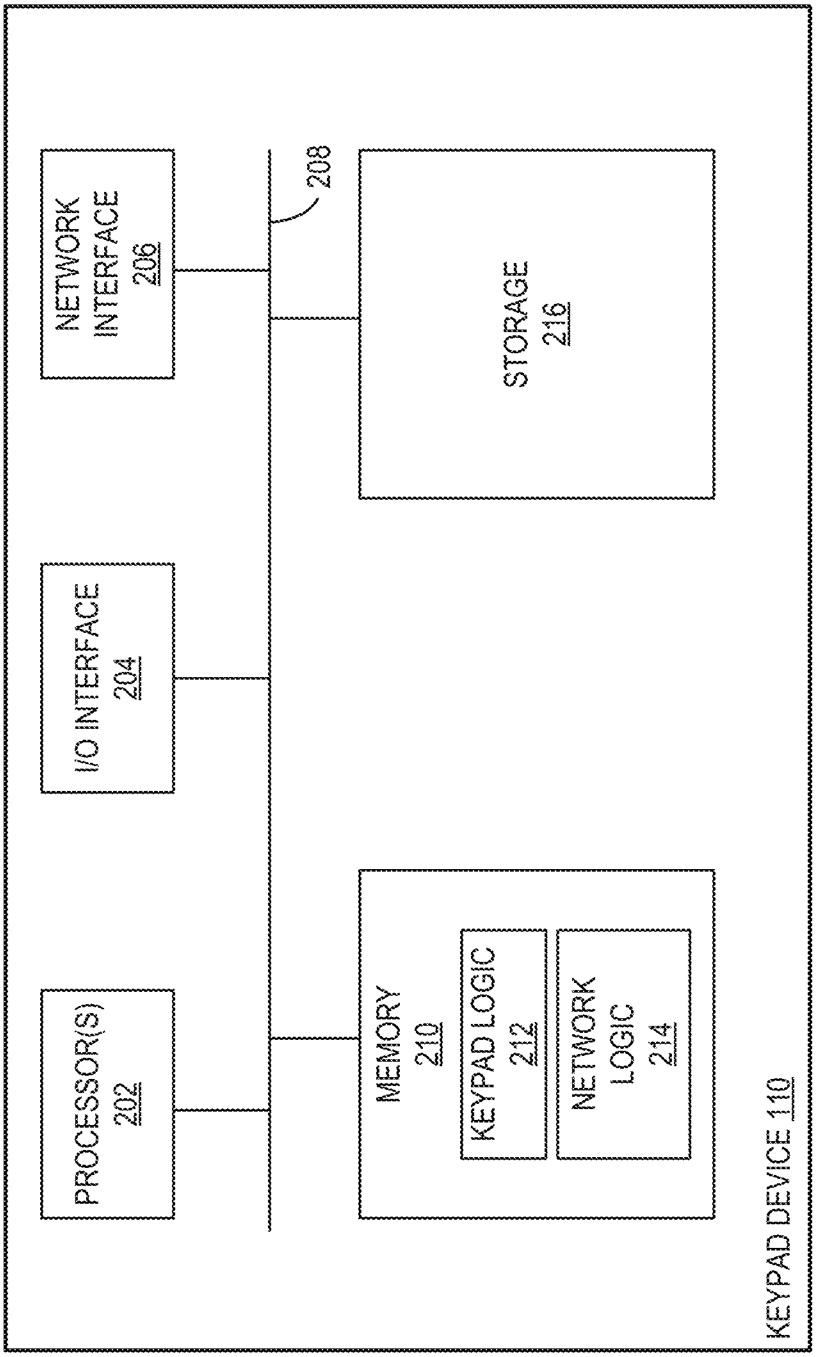
FIG. 2 illustrates a block diagram of the keypad device described relative to FIG. 1, according to disclosed embodiments.

FIG. 2 is a block diagram further illustrating components of the keypad device 110, according to an example embodiment. As shown, the keypad device 110, without limitation, one or more processors 202, an I/O interface 204, a network interface 206, a memory 210, and a storage 216, each interconnected via a hardware bus 208. Of course, an actual keypad device 110 will include a variety of additional hardware components not shown. The memory 210 may include a keypad logic 212 and a network logic 214.

The processor 202 retrieves and executes programming instructions stored in the memory 210. The hardware bus 217 is used to transmit instructions and data between the interconnected components. The processor 202 is included to be representative of a single CPU, multiple CPUs, a single CPU having multiple processing cores, and the like. The memory 210 is generally included to be representative of memory and storage, e.g., DDR and flash memory spaces. The network interface 206 may be embodied as any hardware, software, or circuitry (e.g., a network interface card) used to connect the keypad device 110 over the network 112 and providing the network communication functions described above. The network interface 206 may operate according to network logic 214 for providing gateway controller functionality to the keypad device 110.

The I/O device interface allows I/O devices, such as a camera, reader device, and/or a graphical display unit (not shown) to communicate with hardware and software components of the keypad device 110. In addition to the aforementioned examples, the I/O devices of the keypad device 110 may be embodied as any type of input/output device connected with or provided as a component thereto, such as speaker and microphone devices.

Illustratively, the keypad logic 212 is embodied as any hardware, software, or circuitry to process user input and authenticate the user. The keypad logic 212 may also include instructions for activating a locking device coupled with the keypad device 110. The keypad logic 212 may also include instructions for transmitting and receiving data (e.g., access control data, configuration data, etc.) from the cloud service 116.

Figure 3:
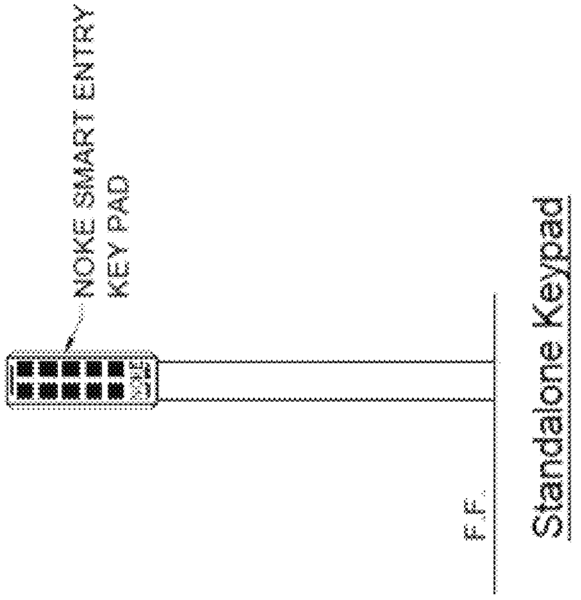
FIGS. 3-5 illustrate various settings in which the keypad device of FIG. 1 may be deployed, according to disclosed embodiments.
Figure 4:
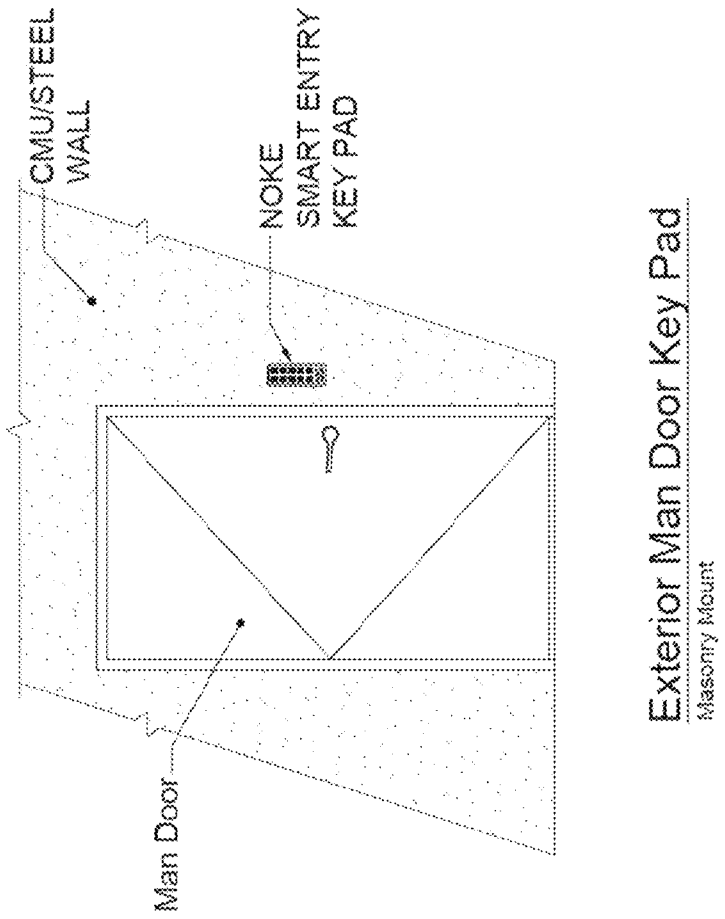
Figure 5:
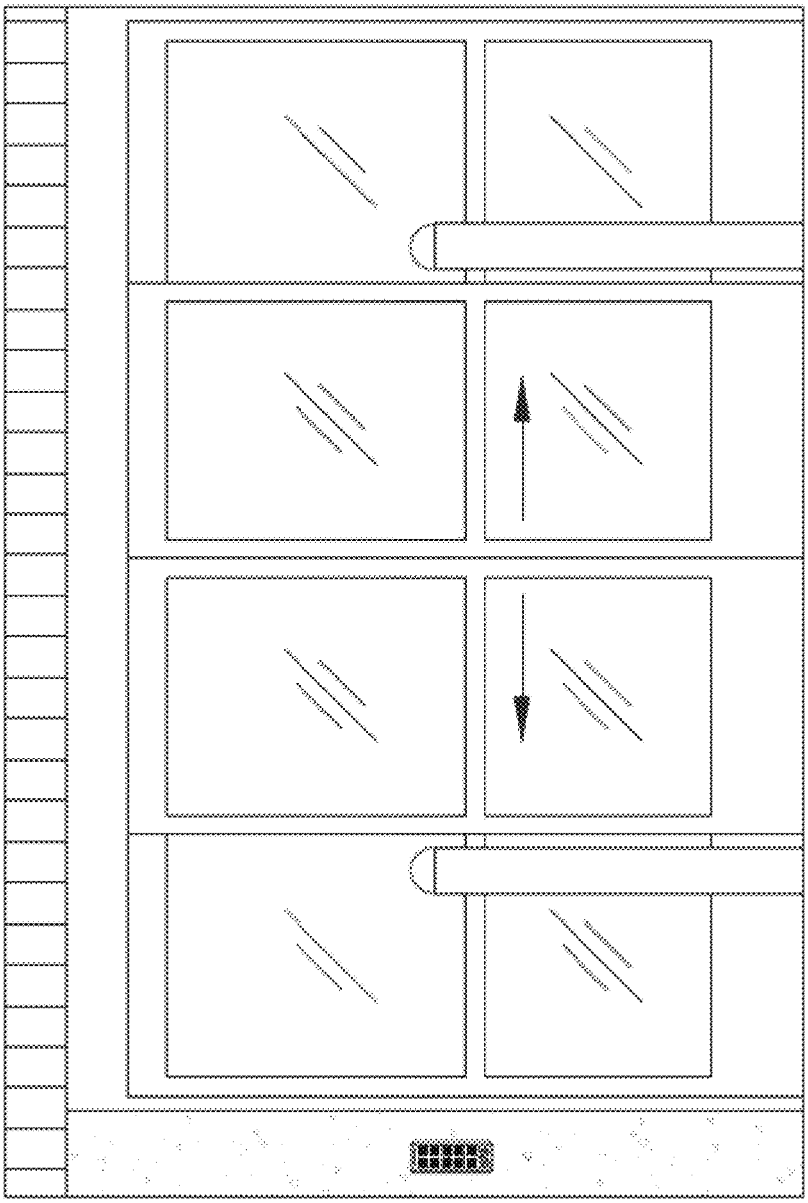

FIGS. 3-5 illustrate various use cases in which the keypad device 110 may be deployed. FIG. 3 illustrates a standalone keypad device 110. FIG. 4 illustrates the keypad device 110 mounted on a wall and positioned next to a man door. The keypad device 110 may be coupled with a locking and/or latching mechanism of the man door to control access to the door. FIG. 5 illustrates the keypad device 110 mounted on a wall and positioned next to an exterior sliding door. Similar to the keypad device of FIG. 4, the keypad device 110 may be coupled with a locking and/or latching mechanism to control access to the sliding door. The keypad device 110 may also be configured with logic to activate the opening of the sliding door after successful user authentication.

Figure 6:
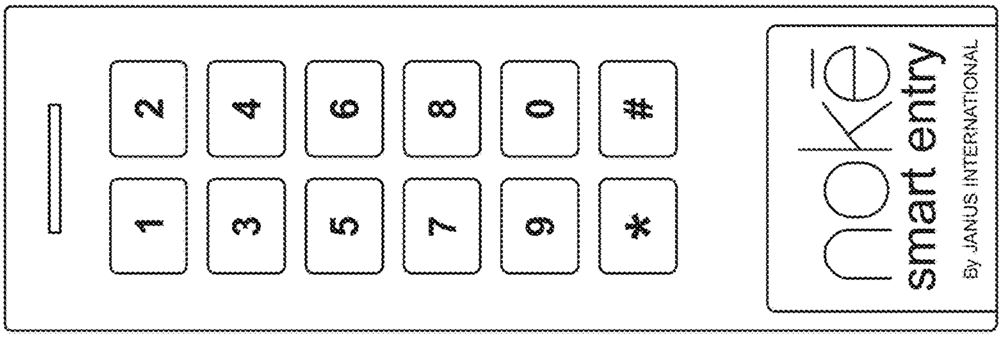
FIGS. 6 and 7 illustrate different embodiments of the keypad device of FIG. 1, according to disclosed embodiments.

FIG. 6 illustrates an example embodiment of the keypad device 110. Particularly, the keypad device 110 is formed of a metal housing, having press buttons labeled with alphanumeric characters and symbols. The top portion of the keypad also includes a slot from which one or more colored LED lights may flash (e.g., upon authentication, grant, or denial of access). The bottom portion of the keypad also includes an area in which branding such as a logo may be applied.

Figure 7:
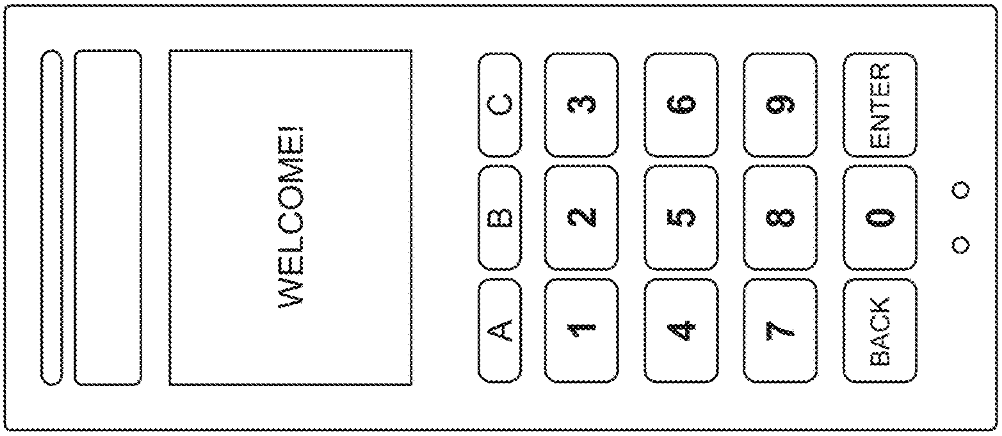

FIG. 7 illustrates another embodiment of the keypad device 110, in which the keypad device 110, having similar features as the keypad device 110 of FIG. 6, also includes a graphical display unit. The graphical display unit may be a LED/LCD display and may feature backlighting to allow for improved visibility. In addition, the graphical display unit may provide a variety of information to a user, such as user input, authentication messaging (e.g., a grant or denial of entry messaging), branding, and advertisements. Such communications may be programmed on-site into the keypad device 110. In an embodiment, the keypad device 110 may communicate with the cloud service 116 via the network 112 to obtain such information. For example, an operator of the storage facility system 106 may occasionally push updates (e.g., alerts, facility status information, and the like) to the keypad device 110 through the cloud service 116. In addition, the operator may occasionally push advertisement data from sponsors to the keypad device 110 via the cloud service 116 for subsequent display.

Figure 8:
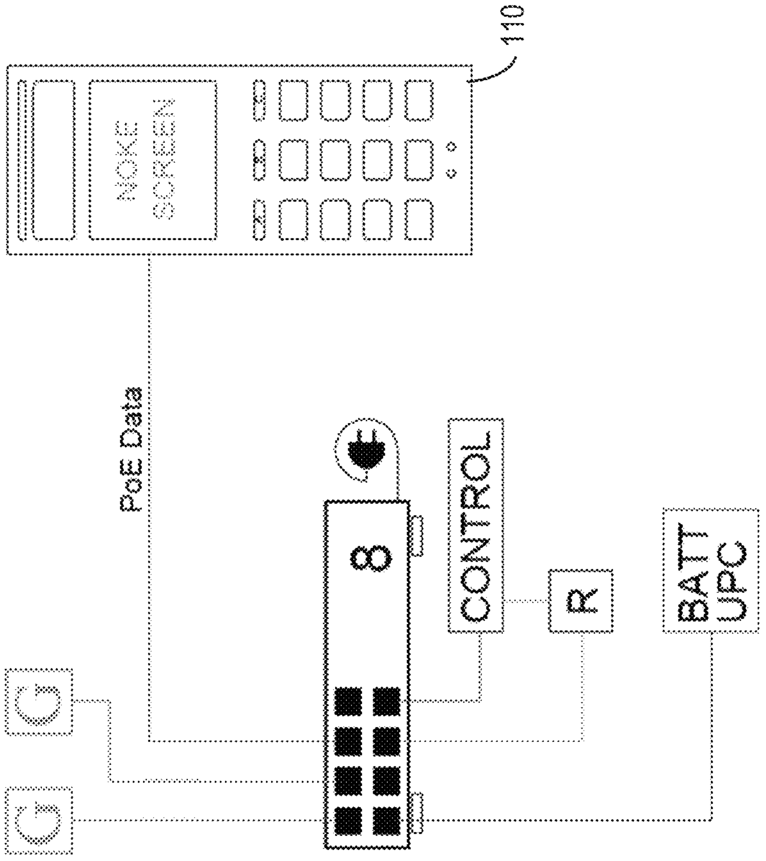
FIG. 8 illustrates a flow diagram of an example method for assessing a test taker, according to disclosed embodiments.

FIG. 8 illustrates a conceptual diagram depicting a wiring scheme for the keypad device 110 to a location within a facility, such as a self-storage facility. A wireless access point (e.g., a router) connecting various devices in the facility, such as gateway devices (labeled G) and the keypad device 110, is shown towards the left and center portion of FIG. 8. The keypad device 110 may be connected to a wireless access point via a single communication wire to provide a Power over Ethernet (PoE) connection thereto, advantageously providing the keypad device 110 with electricity as well as data from the wireless access point.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration only, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media which may be read and executed by one or more processors. A machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided in sub-modules, sub-processes or other units of computer code or data as may be required by a particular design or implementation of the computing device.

In the drawings, specific arrangements or orderings of elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

Within the present disclosure, examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry may include components for facilitating processor operations, for example, suitable components may include transmitters, receivers, modulators, demodulators, filters, modems, analog/digital (AD or DA) converters, diodes, switches, operational amplifiers, and/or integrated circuits.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

What is claimed is:

1. A self-storage access control device, comprising:

a control device housing defining an interior for housing electronic components, the electronic components including:

one or more processors;

a network interface configured for network communications;

a user interface; and a memory storing keypad logic and gateway controller logic, wherein the keypad logic including instructions for controlling access to one or more passages in a self-storage facility and the gateway controller logic includes instructions for transmitting and receiving data over a communication network via the network interface, wherein execution of the keypad logic by the one or more processors is configured to selectively communicate authorization for access to at least one of the passages of the self-storage facility, wherein the processors, network interface and memory are housed within the interior of the control device housing, and the gateway controller logic is adapted to permit direct communication between the network interface and the communication network without intermediary gateway, wherein the network interface communicates with a local network apart from the communication network.

2. The self-storage access control device of claim 1, wherein the network interface includes a network interface card (NIC).

3. The self-storage access control device of claim 2, wherein the NIC includes a wireless NIC.

4. The self-storage access control device of claim 1, wherein the device is configured for communications between the local network and the communication network via the network interface.

5. The self-storage access control device of claim 1, wherein the user interface comprises a numerical keypad for receiving user input of numerical code.

6. The self-storage access control device of claim 5, wherein the numerical keypad is a physical keypad comprising mechanical buttons.

7. The self-storage access control device of claim 1, wherein the user interface comprises a graphical display unit.

8. A system for access control for the self-storage facility comprising the device of claim 1, and a cloud service arranged in communication with the device via the network.

9. A method of access control for a self-storage facility, the method comprising:

receiving, via a user interface of an access control device, a request for authorization for access to at least one passage of the self-storage facility;

requesting authentication, via a network interface of the access control device for network communications, the network interface arranged in communication via a communication network, responsive to the request for authorization, wherein the network interface communicates with a local network apart from the communication network;

receiving confirmation of authentication, over the network via the network interface of the access control device, responsive to successful authentication request; and authorizing access to the at least one passage, via the access control device, responsive to confirmation of authentication, wherein the network interface is housed within a control device housing of the access control device, and requesting authentication via the network interface of the access control device includes direct communication between the access control device and the communication network without intermediate gateway, wherein the network interface communicates with a local network apart from the communication network, wherein operations of the access control device including operating a memory storing keypad logic and gateway controller logic, including executing instructions of the keypad logic for controlling access to one or more passages in a self-storage facility and executing instructions of the gateway controller logic for transmitting and receiving data over a communication network via the network interface, wherein execution of the keypad logic by the one or more processors is configured to selectively communicate authorization for access to at least one of the passages of the self-storage facility.

10. The method of access control of claim 9, wherein requesting authentication via the network interface includes requesting via a network interface card (NIC) of the network interface.

11. The method of access control of claim 10, the NIC is a wireless NIC.

12. The method of access control of claim 10, wherein communicating with the local network includes facilitating communications between the local network and the communications network.

13. The method of access control of claim 9, wherein receiving the authentication request includes receiving user entry of a passcode.

14. The method of access control of claim 13, wherein requesting authentication includes indication of the used-entered passcode.

* * * * *